United States Patent [19]

Sakamoto et al.

[11] 3,900,082

[45] Aug. 19, 1975

[54] ROD CONTROLLED POSITIVE LOCK BRAKE

[75] Inventors: Kenichi Sakamoto; Tamio Kawamoto, both of Yokohama, Japan

[73] Assignee: Nissan Motor Co., Ltd., Japan

[22] Filed: May 31, 1974

[21] Appl. No.: 475,251

[30] Foreign Application Priority Data
June 8, 1973  Japan.................. 48-63853

[52] U.S. Cl................... 188/69; 74/577 S
[51] Int. Cl................................. B62c 7/02
[58] Field of Search............ 188/69, 31; 192/4 A; 74/102, 103, 104, 107, 577 R, 577 S

[56]  References Cited
UNITED STATES PATENTS

| | | | |
|---|---|---|---|
| 2,875,856 | 3/1959 | Mrlik et al. | 188/69 |
| 3,690,416 | 9/1972 | Yamada | 188/69 |
| 3,703,941 | 11/1972 | Ohie et al. | 188/31 |
| 3,729,075 | 4/1973 | Piret | 188/69 |

FOREIGN PATENTS OR APPLICATIONS

| | | | |
|---|---|---|---|
| 1,011,378 | 11/1965 | United Kingdom | 188/69 |

*Primary Examiner*—Trygve M. Blix
*Assistant Examiner*—Edward R. Kazenske
*Attorney, Agent, or Firm*—Robert E. Burns; Emmanuel J. Lobato; Bruce L. Adams

[57]  ABSTRACT

A spring-loaded cam plate having a raised portion is mounted on a brake pawl outer surface opposite to its inner toothed surface to be pivotable relative to the pawl along the outer surface. A driver operable control rod is formed with cylindrical and semi-cylindrical portions which are engageable with the raised cam portion of the cam plate to urge the brake pawl into and out of engagement with a brake gear.

7 Claims, 6 Drawing Figures

ROD CONTROLLED POSITIVE LOCK BRAKE

This invention relates generally to brakes, and more particularly to a positive acting parking brake especially to be used with power transmission mechanisms for automotive vehicles.

It is a primary object of this invention to provide a novel and improved parking brake mechanism which requires a minimum amount of space for accommodation in a transmission housing.

Other objects, features and advantages of this invention will be fully described below with reference to the accompanying drawings.

Figure 1:
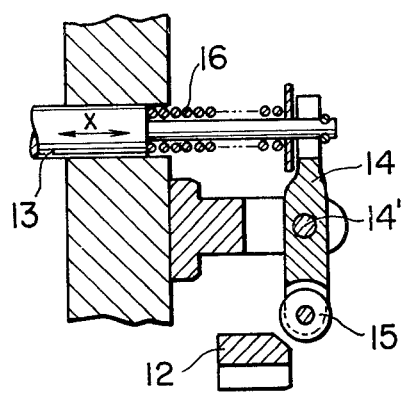
FIG. 1 is a schematic view in section showing an example of prior art parking brake mechanism.
Figure 2:
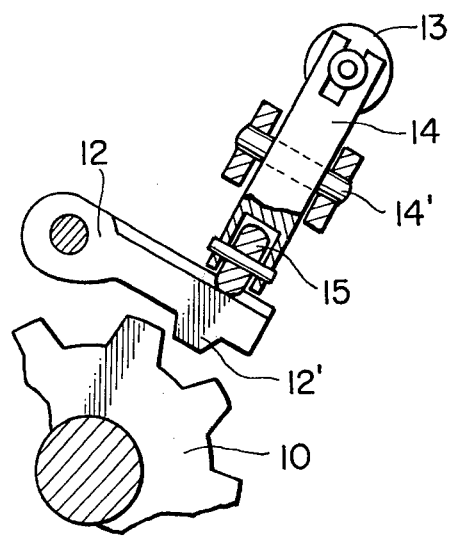
FIG. 2 is a side view partly in section of the mechanism shown in FIG. 1.

Reference is first made to the prior art mechanism shown in FIGS. 1 and 2. In this example, a control rod 13 which is connected to a driver operable transmission shift lever (not shown) is axially movably carried by a transmission housing. The axial movement of the rod 13 rotates a lever 14 which is pivotable about a shaft 14', whereupon a roller 15 carried by the lever 14 rides up and down the heel portion of a brake pawl 12. The pawl 12 is thus urged to a brake applying position, in which a tooth 12' is registered with the teeth of a parking gear 10. When the tooth 12' is misaligned with the teeth of the parking gear 10, a spring 16 disposed as shown is compressed to exert a force to urge the tooth 12' into mesh with the gear teeth upon slight rotation of the gear 10. It will be apparent that the mechanism described above is bulky and requires a relatively large space both in longitudinal and vertical directions of the transmission housing.

Figure 3:
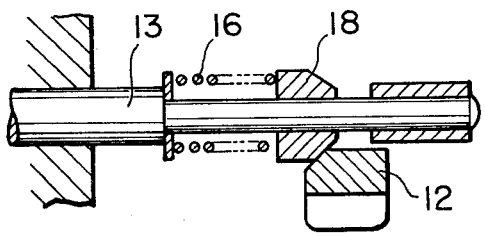
FIG. 3 is a schematic view in section showing another example of prior art parking brake mechanism.

There is another example of prior art mechanism shown in FIG. 3, which dispenses with a lever and instead, is provided with a conical cam member 18 disposed on the control rod 13. Although a space in the vertical direction is saved in this example, the amount of longitudinal space being required is equal to or rather greater than that in the first example.

The present invention contemplates to overcome the shortcomings accompanied by these illustrated examples of the prior art in a manner that will be hereinafter described.

Figure 4:
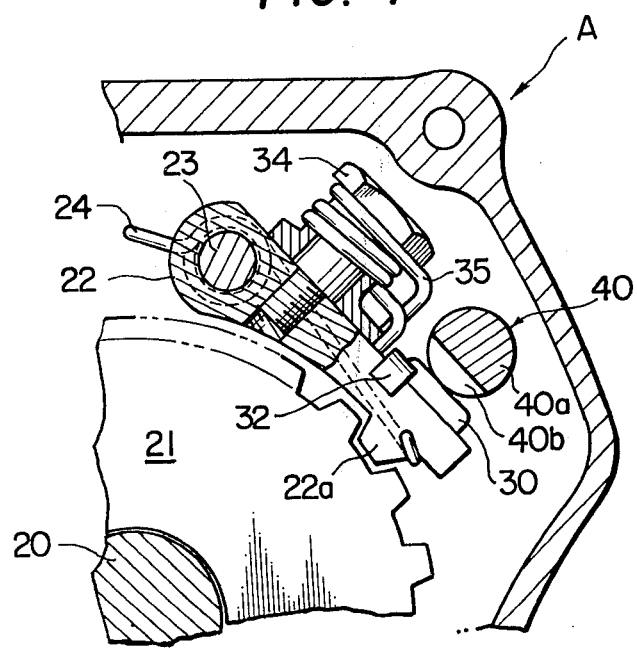
FIG. 4 is a side view partly in section of the parking brake mechanism according to the invention, with a brake pawl tooth engaged with teeth of a parking gear.
Figure 5:
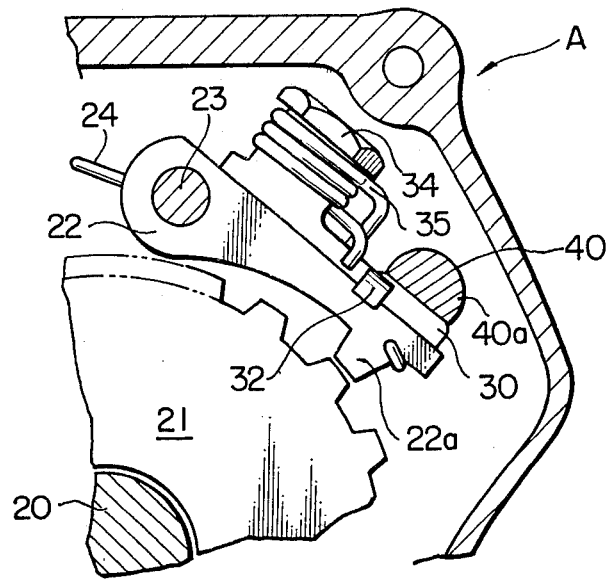
FIG. 5 is a view similar to FIG. 4, with the brake pawl tooth misaligned with the teeth of the parking gear.
Figure 6:
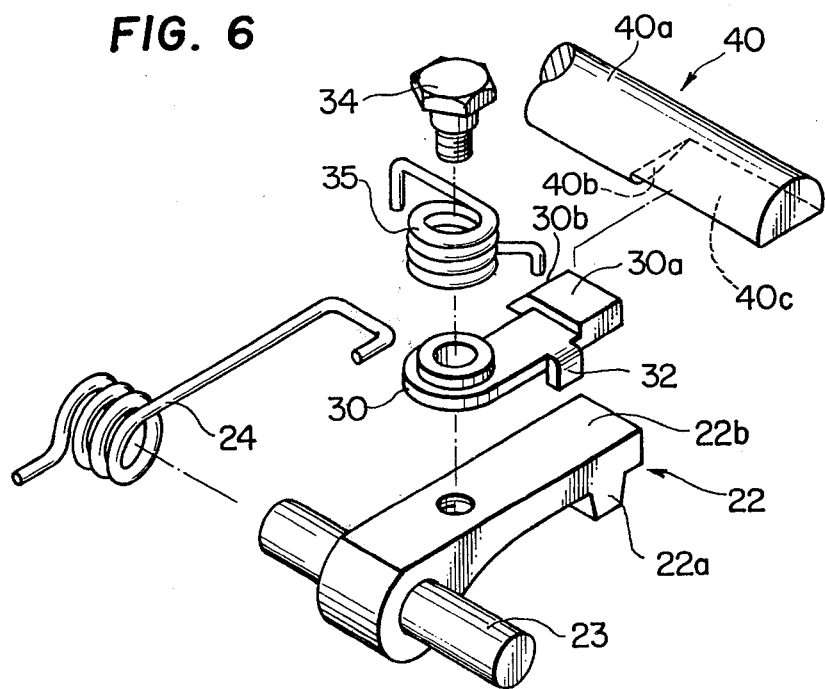
FIG. 6 is an exploded view showing the individual components of the mechanism shown in FIGS. 4 and 5.

Referring now to FIGS. 4 to 6, a toothed parking gear 21 is conventionally carried by a transmission output shaft 20 for rotation therewith. A brake pawl 22 is mounted on a support shaft 23 for oscillation into and out of engagement of tooth 22a with the teeth (no numeral) of the parking gear 21. The brake pawl 22 is urged by a spring 24 in a direction away from the engaged position. An outer side opposite to the tooth 22a of the brake pawl 22 is formed with a flat surface 22b as seen in FIG. 6.

A cam plate 30 is pivotally mounted on the flat surface 22b by fastening means such as a bolt 34. Whilst, thus, the cam plate 30 is rotatable or oscillatable about the shaft 23 together with the brake pawl 22, it is oscillatable about the bolt 34 relative to the pawl 22 along the plane containing the flat surface 22b. There is provided a spring 35 disposed around the bolt 34, one end of which is anchored to a small hole (no numeral) formed in the flat surface 22b (see FIG. 6) and the other to one side of the cam plate 30. The spring 35 is pre-stressed to urge the cam plate 30 in a counterclockwise direction, as viewed along the arrow A shown in FIGS. 4 and 5, so that the cam plate 30 substantially overlaps the flat surface 22b. The cam plate 30 has a raised cam portion 30a which in turn is formed with a wedge surface 30b as clearly seen in FIG. 6. On the side opposite to the wedge surface 30b of the cam plate formed is a stop 32 which is engageable with the corresponding side of the pawl 22 to limit the movement of the cam plate 30 by the force of the spring 35.

A cylindrical control rod 40, which is connected to any conventional driver operable transmission shift lever (not shown) located in the driver compartment of the vehicle, axially movably extends in a direction parallel to the transmission output shaft 20. As best seen in FIG. 6, a portion of the rod 40 is cut away to provide a semi-cylindrical portion 40c which formed shoulder or wedge surface 40b with a full-diameter cylindrical portion 40a.

When in operation the shift lever is moved by the driver to a parking position, the control rod 40 is moved toward the cam plate 30, the flat surface of the semi-cylindrical portion 40c sliding on the raised cam portion 30a, until the wedge surface 40b abuts against the wedge surface 30b. If the tooth 22a of the brake pawl is now in alignment with the teeth of the parking gear 21 as shown in FIG. 4, the full-diameter portion 40a rides upon the raised cam portion 30a thereby urging the pawl 22 into engagement with the parking gear 21. If the pawl tooth is misaligned with the gear teeth as in FIG. 5, the wedge surface 40b remains in abutment against the wedge surface 30b so that the control rod 40 urges the cam plate 30 in a clockwise direction as viewed in the arrow-indicated direction in FIGS. 4 and 5, overcoming the action of the spring 35. As soon as the pawl tooth 22a and the gear teeth come into alignment upon slight rotation of the gear 21, the cam plate 30 is oscillated back in the opposite direction until the stop 32 abuts against the side of the brake pawl 22. The full-diameter portion 40a is now able to easily ride up the raised cam portion 30a.

It will be readily understood from the foregoing description that a minimum stroke in which the control rod reciprocates is necessary and that all the component elements can be assembled into a compactized unit according to the invention. This is an obvious advantage of this invention over the prior art mechanisms already described.

What is claimed is:

1. A positively acting brake mechanism for braking comprising, a rotary shaft, a brake gear secured to said shaft, a brake pawl having a toothed surface radially of the brake gear and mounted for rotation about a first axis into and out of engagement with said brake gear, means biasing the pawl out of engagement with the brake gear, a plate connected to said brake pawl for rotation therewith about said first axis and for rotation relative to said pawl about a second axis along a plane perpendicular to the plane of rotation of said pawl, said plate having a cam portion with a lateral first wedge surface, a manually operable control element having a raised portion with a second wedge surface, said raised portion being engageable with said cam portion of the plate upon axial displacement of said control element in a direction for rotation of said brake pawl into engagement with the brake gear, and another biasing means biasing said plate to urge it to rotate about said second axis in a first direction toward engagement of the two wedge surfaces, whereby when teeth of the brake gear and the tooth of the brake pawl are misaligned, the second wedge surface abuts and is wedged against the first wedge surface during axial movement of the control element thereby urging the plate in a direction opposite to said first direction against a biasing force of said biasing means, and when the teeth of the brake gear and the tooth of the brake pawl are aligned with each other, said second wedge surface of said raised portion of the control element slides on the wedge surface of the cam portion of the plate during the axial movement of the control element and said raised portion rides on to the brake pawl to urge the brake pawl about said first axis into engagement with the brake gear.

2. A positively acting brake mechanism according to claim 1, further comprising a stop formed on said plate which abuts against said brake pawl upon rotation of the plate in said first direction.

3. A positively acting brake mechanism according to claim 1, including a bolt mounting said plate pivotally on flat surface of said brake pawl opposite to said toothed surface.

4. A positively acting brake mechanism according to claim 3, wherein the biasing force of said another biasing means is so selected that the plate substantially overlaps said surface of the brake pawl.

5. A positively acting brake mechanism according to claim 3, wherein said another biasing means comprises a spring disposed around said bolt.

6. A positively acting brake mechanism according to claim 1, wherein said control element includes a cylindrical rod axially movable in a direction parallel to the axis of rotation of the brake pawl.

7. A positively acting brake mechanism according to claim 6, wherein said rod is formed with a semicylindrical portion.

* * * * *